US008587565B2

(12) United States Patent
Fukushima et al.

(10) Patent No.: US 8,587,565 B2
(45) Date of Patent: Nov. 19, 2013

(54) POSITION INDICATOR, VARIABLE CAPACITOR AND INPUT DEVICE

(75) Inventors: Yasuyuki Fukushima, Saitama-ken (JP); Hiroyuki Fujitsuka, Saitama-ken (JP)

(73) Assignee: Wacom Co., Ltd., Saitama (JP)

( * ) Notice: Subject to any disclaimer, the term of this patent is extended or adjusted under 35 U.S.C. 154(b) by 967 days.

(21) Appl. No.: 12/606,124

(22) Filed: Oct. 26, 2009

(65) Prior Publication Data

US 2010/0117994 A1 May 13, 2010

(30) Foreign Application Priority Data

Nov. 13, 2008 (JP) ................................. 2008-291433

(51) Int. Cl.
*G06F 3/033* (2013.01)
*H01G 7/00* (2006.01)
*H01H 1/00* (2006.01)
*H03K 17/975* (2006.01)

(52) U.S. Cl.
USPC ......... 345/179; 361/283.4; 200/502; 200/600

(58) Field of Classification Search
USPC ........................................................ 345/179
See application file for complete search history.

(56) References Cited

U.S. PATENT DOCUMENTS

| 4,977,480 | A | * | 12/1990 | Nishihara .................. 361/283.4 |
| 5,206,785 | A | | 4/1993 | Fukushima |
| 6,853,369 | B2 | | 2/2005 | Fukushima et al. |
| 7,394,513 | B2 | | 7/2008 | Andou et al. |
| 2001/0038384 | A1 | * | 11/2001 | Fukushima et al. .......... 345/179 |
| 2005/0168678 | A1 | | 8/2005 | Andou et al. |
| 2007/0240914 | A1 | * | 10/2007 | Lai et al. .................... 178/18.06 |
| 2008/0180092 | A1 | * | 7/2008 | Fukushima et al. ..... 324/207.16 |

FOREIGN PATENT DOCUMENTS

| CN | 1652165 A | 8/2005 |
| CN | 101251775 A | 8/2008 |
| EP | 1950772 A2 | 7/2008 |
| JP | 3150685 B2 | 3/2001 |
| JP | 2001-319831 A | 11/2001 |
| JP | 2008186071 A | 8/2008 |

OTHER PUBLICATIONS

Extended European Search Report dated Jul. 12, 2013, for corresponding EP Application No. 09014231.6, 6 pages.

* cited by examiner

*Primary Examiner* — Alexander S Beck
*Assistant Examiner* — K Kiyabu
(74) *Attorney, Agent, or Firm* — Seed IP Law Group PLLC

(57) ABSTRACT

A variable capacitor of a position indicator includes a dielectric, an electrode, a conductive member and a conductive portion. The dielectric has an upper surface and a lower surface opposite the upper surface. The electrode is provided on the upper surface of the dielectric. The conductive member is arranged so as to face the lower surface of the dielectric. The conductive portion is provided on the lower surface of the dielectric and is arranged so as to be electrically connectable to the conductive member. The conductive member is adapted to be elastically deformed when pressed against the lower surface by an external force, such that the capacitance of the variable capacitor changes according to a change of the external force.

13 Claims, 14 Drawing Sheets

FIG. 9A₁
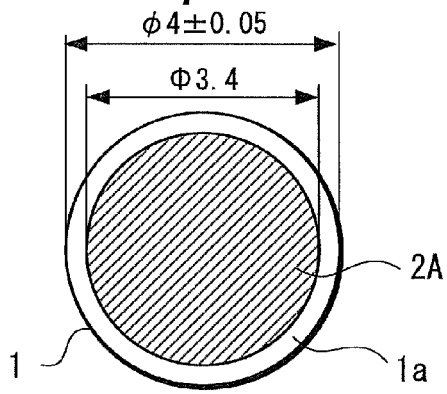
FIG. 9A₂
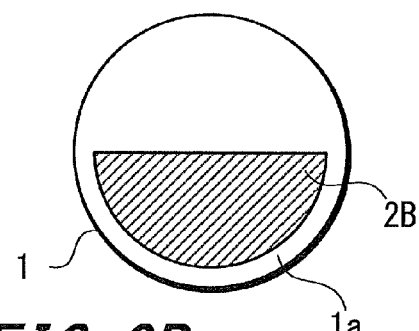
FIG. 9B₁
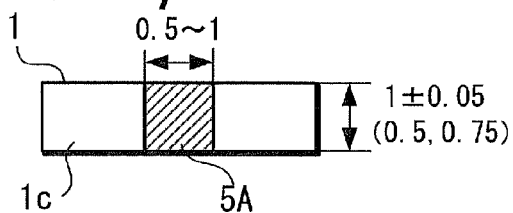
FIG. 9B₂
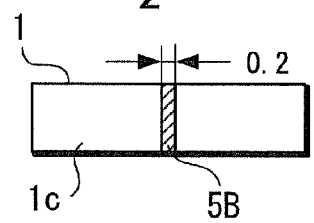
FIG. 9C₁ PATTERN 1
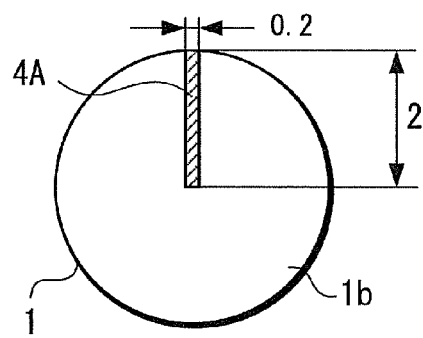
FIG. 9C₂ PATTERN 2
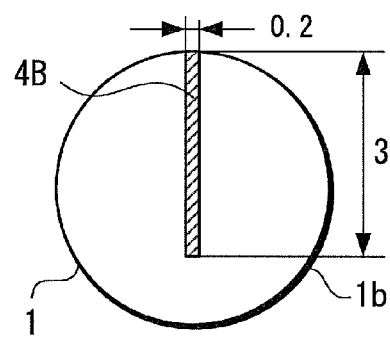
FIG. 9C₃ PATTERN 3
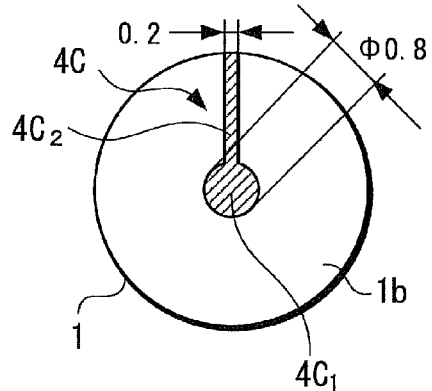
FIG. 9C₄ PATTERN 4
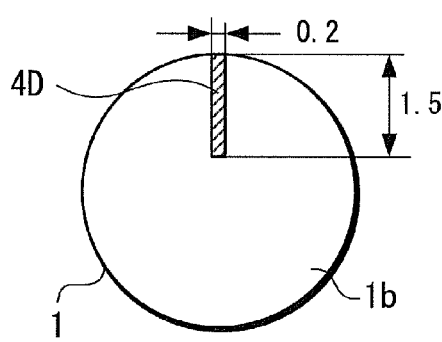

FIG. 10

| | INITIAL CAPACITANCE [pF] | Q |
|---|---|---|
| | 96.1 | 68.8 |
| | 80.2 | 69.1 |
| | 40.8 | 67.6 |

THICKNESS: 1mm

POSITION INDICATOR, VARIABLE CAPACITOR AND INPUT DEVICE

CROSS REFERENCES TO RELATED APPLICATIONS

The present invention claims the benefit of Japanese Patent Application 2008-291433, filed in the Japanese Patent Office on Nov. 13, 2008, the entire content of which is being incorporated herein by reference.

BACKGROUND OF THE INVENTION

1. Field of the Invention

The present invention relates to a position indicator suitable to be used to detect a pen pressure, a variable capacitor adapted to detect the pen pressure, and an input device having the position indicator.

2. Description of the Related Art

In recent years, a coordinate input device has been used as an input device for a personal computer for example. Such a coordinate input device is configured by a pen-like position indicator and a position detecting device having an input surface where input operation such as a pointing operation, a handwritten character input operation and a hand-drawn illustration input operation is performed by using the position indicator.

Further, a variable capacitor such as disclosed in Japanese Patent No. 3150685 (referred to as "Patent Document 1" hereinafter) is used to detect a pen pressure of the position indicator. Further, Japanese Unexamined Patent Application Publication No. 2001-319831 (referred to as "Patent Document 2" hereinafter) discloses a technique in which an electrode on one surface of a variable capacitor is divided into two so that signals become easy to be taken out.

FIGS. 16A and 16B show a concrete configuration of a variable capacitor 200 disclosed in Patent Document 1. The variable capacitor 200 includes a substantially disc-shaped dielectric 201, a first electrode 202 attached on one surface 201a of the dielectric 201, and a second electrode 203 provided on the side of the other surface 201b of the dielectric 201. The second electrode 203 is a flexible member, and is arranged on the side of the other surface 201b of the dielectric 201 via a ring-shaped spacer 204. Further, a rod 210 is provided on the side of the second electrode 203 opposite to the dielectric 201 via an elastic body 205.

A first terminal 206 is provided on the side of one surface of the first electrode 202. The first terminal 206 includes a disc-shaped flange portion 206a, and a lead portion 206b extending from substantially the center of one surface of the flange portion 206a. When a pen pressure is applied to the rod 210, the flange portion 206a is brought into contact with the one surface of the first electrode 202, so that the flange portion 206a is electrically connected to the first electrode 202.

A second terminal 207 is provided on the end portion of the second electrode 203. Similar to the first terminal 206, the second terminal 207 includes a disc-shaped flange portion 207a, and a lead portion 207b extending from substantially the center of one surface of the flange portion 207a. When a pen pressure is applied to the rod 210, the flange portion 207a is brought into contact with the end portion of one surface of the second electrode 203, so that the flange portion 207a is electrically connected to the second electrode 203.

In the variable capacitor 200 having the aforesaid configuration, in a state where there is no pressure or displacement applied to the rod 210 (namely, in a state where the variable capacitor is in the initial state), the other surface 201b of the dielectric 201 and the second electrode 203 are spaced apart from each other by the spacer 204 (see FIG. 16A). Thus, an air layer 208 is formed between the other surface 201b of the dielectric 201 and the second electrode 203, the air layer 208 having the same thickness as that of the spacer 204. The capacitance value between the terminal 206 and the terminal 207 in the initial state (i.e., the initial capacitance) is substantially a serially combined capacitance of the capacitance contributed by the dielectric 201 and the capacitance contributed by the air layer 208, which has a relative dielectric constant of 1.0, and therefore the capacitance value is very small.

However, if a pressure is applied to the rod 210, the second electrode 203 will be bent toward the side of the dielectric 201, and therefore the thickness of the air layer 208 will become smaller than that of the spacer 204. At this time, since the capacitance contributed by the air layer 208 increases in inverse proportion to the thickness of the air layer 208, the capacitance between the terminal 206 and the terminal 207 will increase due to the increase of the capacitance contributed by the air layer 208.

Then, after the second electrode 203 is brought into contact with the other surface 201b of the dielectric 201, the capacitance value between the terminal 206 and the terminal 207 increases substantially in proportion to the contact area between the second electrode 203 and the other surface 201b of the dielectric 201. The pressure (the pen pressure) applied to the rod 210 is detected by detecting the change of the capacitance value between the first terminal 206 and the second terminal 207.

SUMMARY OF THE INVENTION

However, as can be known from FIGS. 16A and 16B, it is obvious that the aforesaid variable capacitor needs to be configured with a large number of components. Further, in the variable capacitor disclosed in Patent Document 1 (refer to FIG. 2 of Patent Document 1), since a double-housing is used as the entire configuration, it is difficult to reduce the outer diameter of the variable capacitor. Further, since a precision forming process needs to be employed to produce the double-housing, a clean booth will be indispensable in production process, which is a factor that leads to high manufacturing cost.

Compared to the aforesaid configuration, in the variable capacitor disclosed in Patent Document 2, the signal is taken out from one surface side of a dielectric, so that the device can be simplified. However, since generation of the capacitance between the bipartite electrodes is unavoidable, it is uncertain that the variable capacitor disclosed in Patent Document 2 exhibits sufficiently good characteristics.

The present invention has been made in view of the aforesaid problems, and one object of the present invention is to simplify the configuration of the variable capacitor that constitutes the pen-pressure detecting section.

To solve the aforesaid problems and achieve one object of the present invention, a position indicator according to an aspect of the present invention includes: a case; a rod housed in the case and having one end thereof projected to the outside of the case; and a variable capacitor whose capacitance changes when an external force is applied through the rod. The variable capacitor includes: at least one dielectric, an electrode, a conductive member, and a conductive portion. The dielectric has a first surface and a second surface opposite the first surface. The electrode is provided on the first surface of the dielectric. The conductive member faces the second surface of the dielectric. The conductive portion is provided on the second surface of the dielectric, the conductive portion being able to be electrically connected to the conductive member. When subjected to an external force, the conductive member will be elastically deformed due to being pressed against the second surface by the external force so as to form a flat surface that faces (or is opposed to) the electrode, and the area of the flat surface changes according to the change of the external force.

According to another aspect of the present invention, a variable capacitor is provided, which includes: at least one dielectric, an electrode, a conductive member, and a conductive portion. The dielectric has a first surface and a second surface opposite the first surface. The electrode is provided on the first surface of the dielectric. The conductive member faces the second surface of the dielectric. The conductive portion is provided on the second surface of the dielectric, the conductive portion being able to be electrically connected to the conductive member. When subjected to an external force, the conductive member will be elastically deformed due to being pressed against the second surface by the external force so as to form a flat surface that faces (or is opposed to) the electrode, and the area of the flat surface changes according to the change of the external force.

An input device according to another aspect of the present invention includes a position indicator and a position detecting device. The position indicator has a case; a rod housed in the case, one end of the rod being projected to the outside of the case; and a variable capacitor whose capacitance changes when an external force is applied through the rod. The position detecting device has an input surface on which the one end of the rod indicates its own position, the position detecting device being adapted to detect the position indicated by the one end of the rod.

The variable capacitor includes: at least one dielectric, an electrode, a conductive member, and a conductive portion. The dielectric has a first surface and a second surface opposite the first surface. The electrode is provided on the first surface of the dielectric. The conductive member faces the second surface of the dielectric. The conductive portion is provided on the second surface of the dielectric, the conductive portion being able to be electrically connected to the conductive member. When subjected to the external force, the conductive member will be elastically deformed due to being pressed against the second surface by the external force so as to form a flat surface that faces (or is opposed to) the electrode, and the area of the flat surface changes according to the change of the external force.

According to the present invention, it is possible to simplify the configuration of a variable capacitor that constitutes a pen-pressure detecting section, and it is possible to reduce the inner diameter of a position indicator so as to reduce the size of the position indicator.

Figure 11:
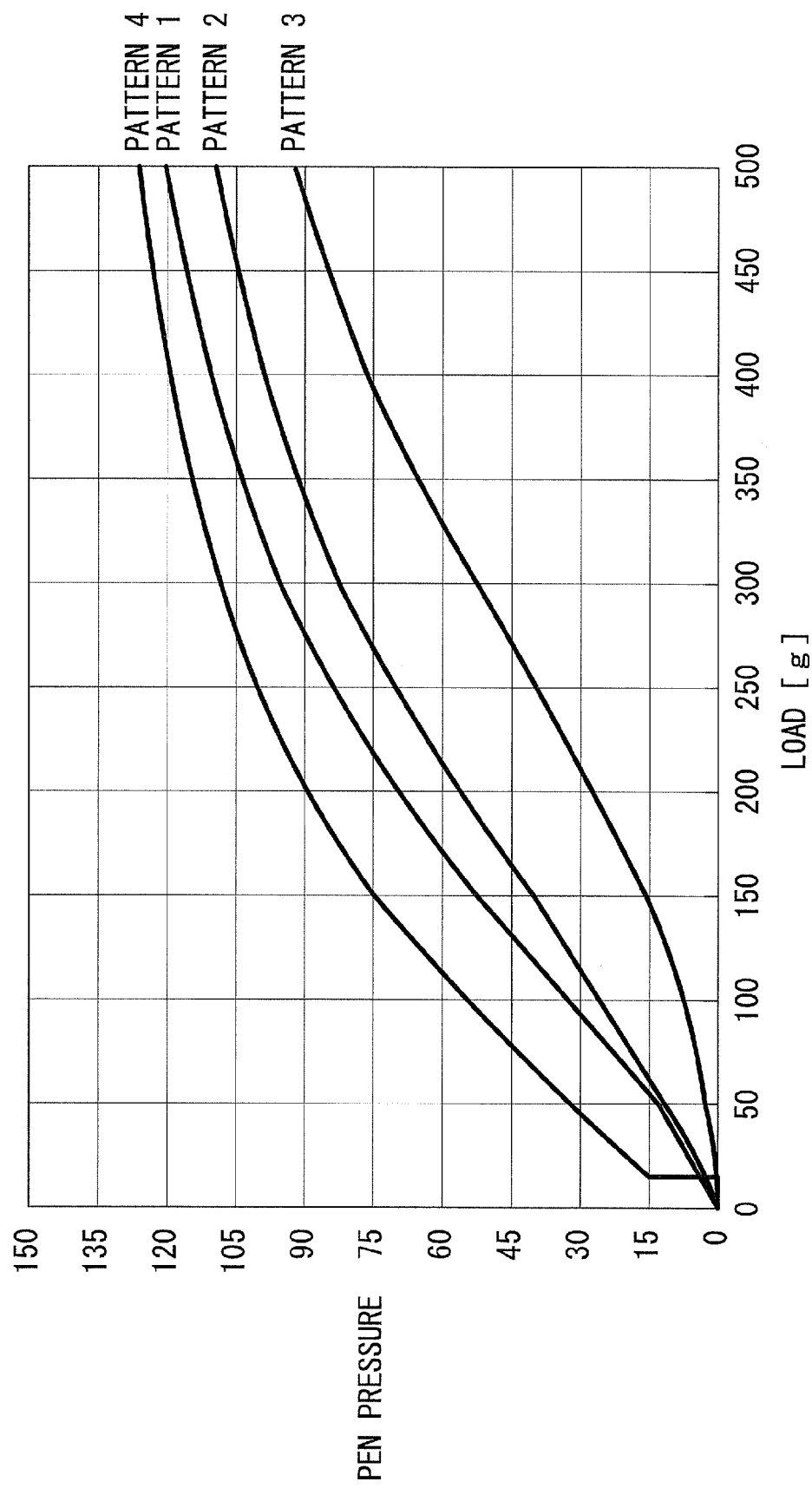
Figure 12A:
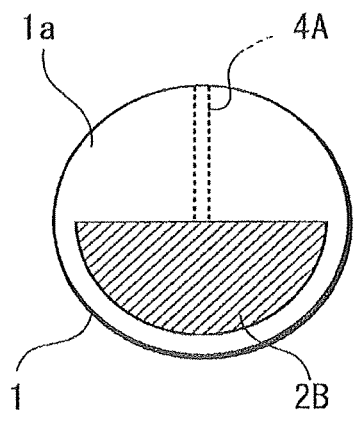
Figure 12B:
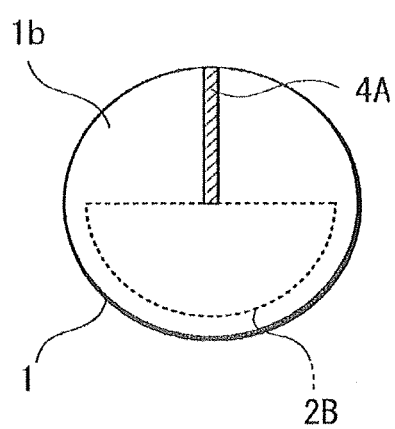
Figure 13A:
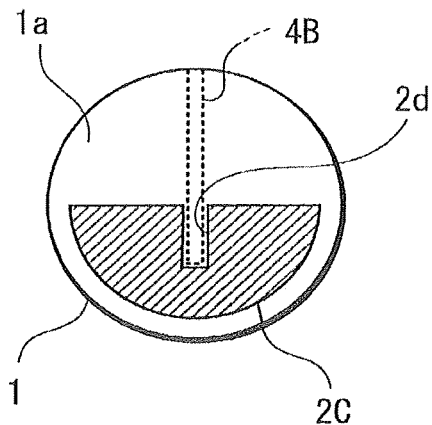
Figure 13B:
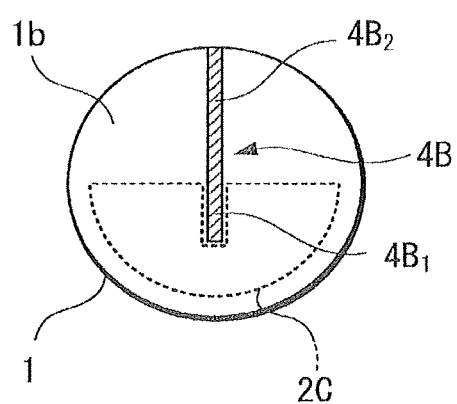
Figure 14:
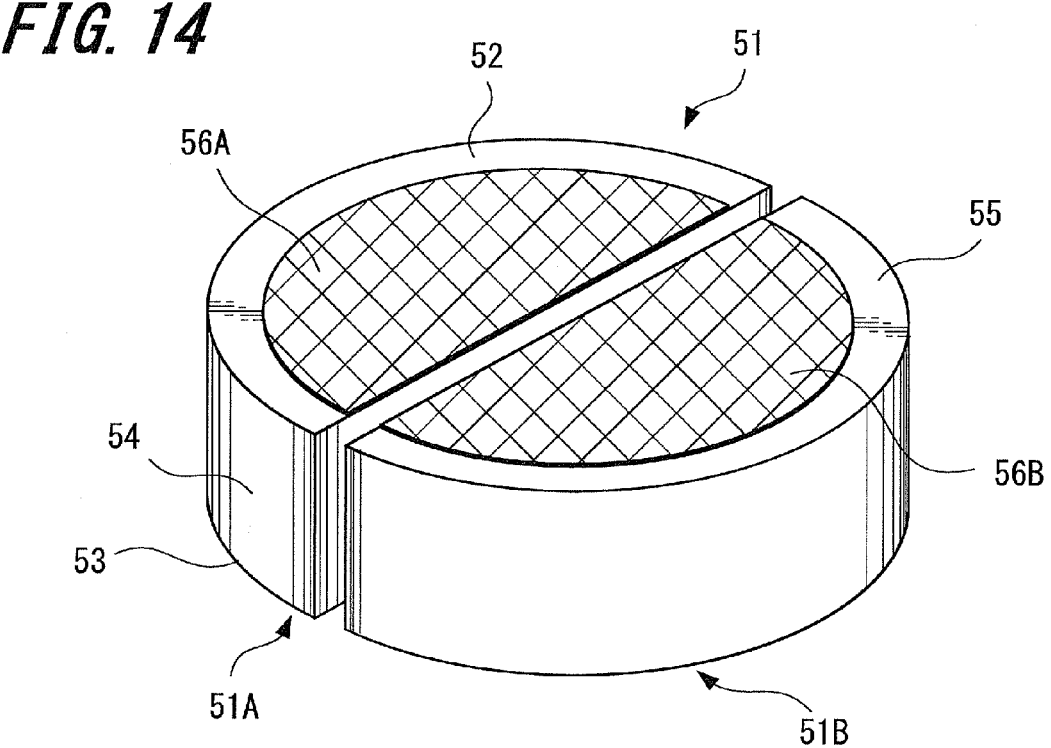
Figure 15:
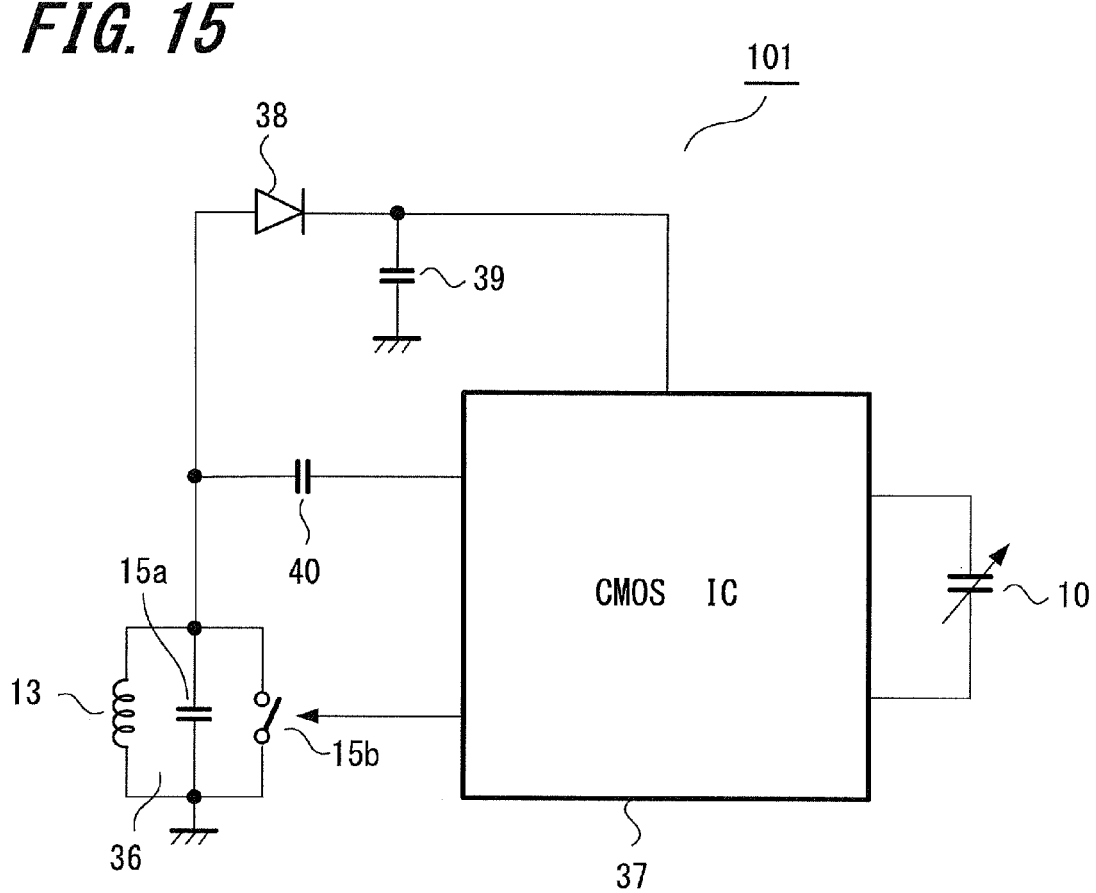
Figure 16A:
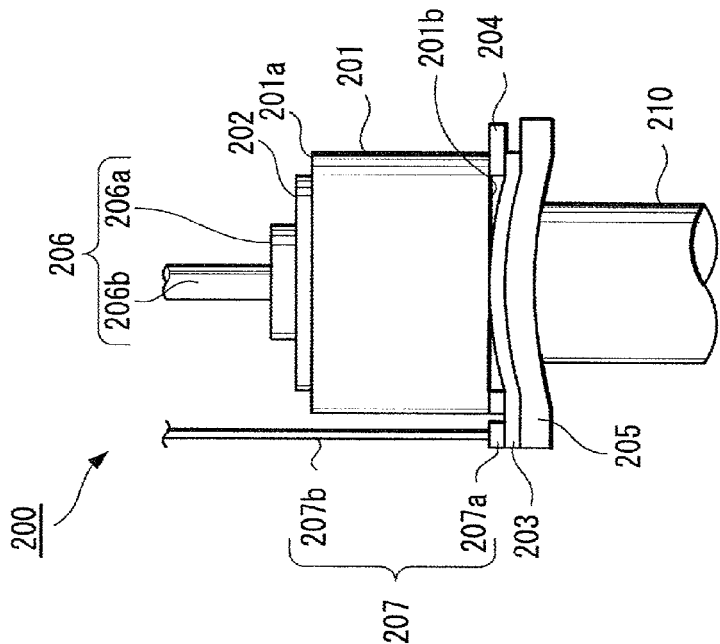
Figure 16B:
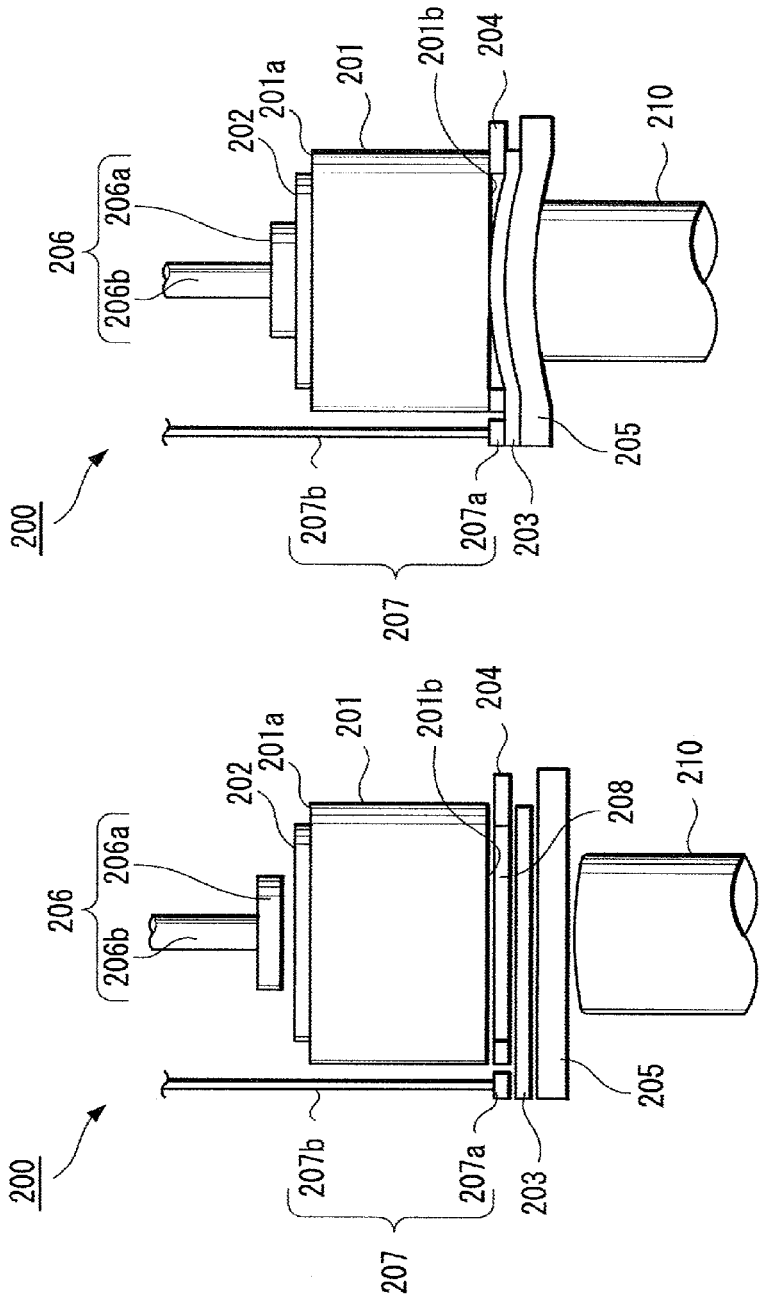

FIGS. $9A_1$, $9A_2$, $9B_1$, $9B_2$, $9C_1$, $9C_2$, $9C_3$ and $9C_4$ are illustrations explaining examples of the shape of an electrode, a conductive portion and a connecting terminal of a variable capacitor to which the present invention is applied;

FIG. 10 is an illustration showing the relation between the shapes of the electrode and the connecting terminal, initial capacitance and Q factor (quality factor) of a variable capacitor to which the present invention is applied;

FIG. 11 is a graph showing pen pressure level-load characteristics which change according to the change of the shape of the conductive portion of a variable capacitor to which the present invention is applied;

FIGS. 12A and 12B are illustrations explaining a first combination of the electrode and the conductive portion of a variable capacitor to which the present invention is applied;

FIGS. 13A and 13B are illustrations explaining a second combination of the electrode and the conductive portion of a variable capacitor to which the present invention is applied;

FIG. 14 is a perspective view showing a second embodiment of a dielectric of a variable capacitor to which the present invention is applied;

FIG. 15 is an electrical circuit diagram showing a second embodiment of a position indicator to which the present invention is applied; and FIGS. 16A and 16B are illustrations showing a known variable capacitor.

DETAILED DESCRIPTION OF THE PREFERRED EMBODIMENT(S)

An embodiment of the present invention will be described below with reference to FIGS. 1 to 7. First, the configuration of an input device 400 according to an embodiment of the present invention will be described below with reference to FIG. 1.

The input device 400 includes a position indicator 100 and a position detecting device 300. The position indicator 100 is used at a position opposed to an upper surface 300a of the position detecting device 300. The position detecting device 300 detects the coordinates of a position indicated by the position indicator 100. The position detecting device 300 can be connected to a personal computer (not shown) to transmit the detected coordinates of the position indicated by the position indicator 100 to the personal computer. Thus, based on the received information of the coordinates of the position indicated by the position indicator 100, input operation such as a hand-drawn illustration input operation and a handwritten character input operation can be performed with various software installed on the personal computer.

The position indicator 100 includes a variable capacitor 10, a rod 11, a ferrite core 12, a position indicating coil 13, a lead wire 14, a circuit board 15, and a case 16 for housing these components. The case 16 has a shape of a writing utensil such as a ball-point pen, a pencil and the like.

Figure 2A:
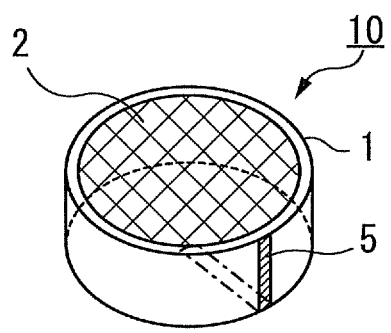
FIGS. 2A to 2D are illustrations showing a first embodiment of a variable capacitor to which the present invention is applied.
Figure 2B:
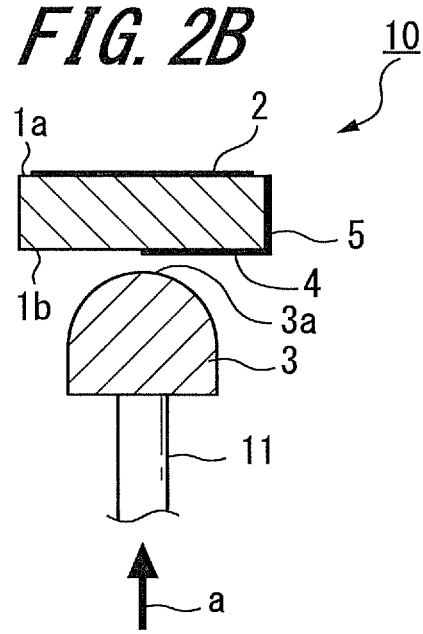
Figure 2C:
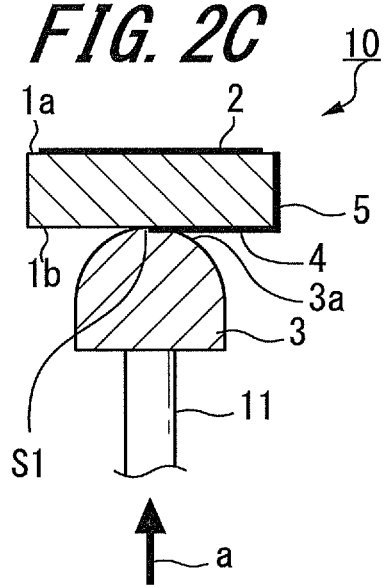
Figure 2D:
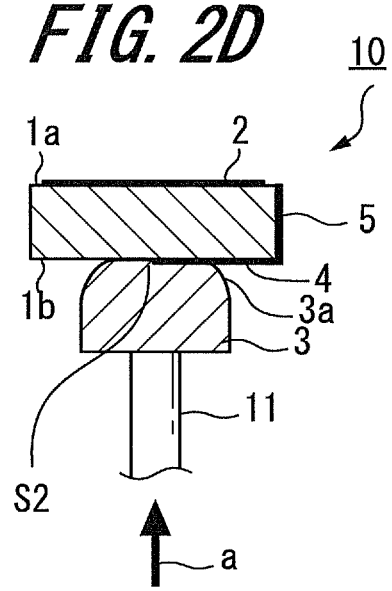

The variable capacitor 10 includes a dielectric 1, an electrode 2, a conductive member 3 and a conductive portion 4 (seen in FIGS. 2B-2D). The dielectric 1 has a flat cylindrical shape. The dielectric 1 is arranged so that the axis thereof extends along the axial direction of the case 16. The electrode 2 is provided on a first surface 1a (referred to as "upper surface" hereinafter) of the dielectric 1. The electrode 2 forms a first electrode, which is one of a pair of electrodes which constitute the variable capacitor 10. The conductive portion 4 is provided on a second surface 1b (referred to as "lower surface" hereinafter) of the dielectric 1, the second surface 1b being opposite to the first surface 1a.

The conductive member 3 is arranged so as to face the lower surface 1b of the dielectric 1. A second electrode, which is one of the pair of electrodes which constitute the variable capacitor 10, is formed by electrically connecting the conductive member 3 with the conductive portion 4 provided on the lower surface 1b of the dielectric 1. Incidentally, the details of the configuration and operation of the variable capacitor 10 will be described later.

The rod 11 is a member equivalent to a core of a writing utensil (such as a core of a ball-point pen, a lead of a mechanical pencil, or the like). When a user uses the position indicator 100 to perform handwriting operation (for example, to handwrite a character) on the position detecting device 300, the rod 11 transmits its pen pressure to the conductive member 3.

The rod 11 passes through the cylindrical ferrite core 12 which has a through-hole. One end of the rod 11 is formed in a substantially protruded shape. The one end of the rod 11 protrudes to the outside of the case 16 from a tip-end portion 16a of the case 16 to serve as a pen tip (indicating portion) for performing position indication. The conductive member 3 is provided on the other end of the rod 11. The rod 11 is held inside the case 10 by a supporting member (not shown) so that when subjected to a pressure in the axial direction of the case 16, the rod 11 will move in the direction of arrow "a".

The position indicating coil 13 is wound around the periphery of the ferrite core 12. A resonant circuit 17 (FIG. 3) is configured with the position indicating coil 13, the variable capacitor 10, and a resonant capacitor 15a mounted on the circuit board 15. The position indicating coil 13 is connected in parallel with the resonant capacitor 15a through the lead wire 14.

The position detecting device 300 transmits signals to the position indicator 100 and receives signals transmitted from the position indicator 100 to detect the position of the position indicator 100 that performs position indication. The position detecting device 300 includes a plurality of position detecting coils 20 parallel-arranged respectively in X-axis direction and Y-axis direction at a predetermined interval.

The position detecting device 300 sequentially supplies signals having an arbitrary frequency from the plurality of position detecting coils 20 to the position indicator 100. Further, the position detecting device 300 detects the resonance signal transmitted from the position indicating coil 13 of the position indicator 100 with the plurality of position detecting coils 20. At this time, the position detecting device 300 detects the position indicated by the position indicator 100 based on both the positions of the position detecting coils 20, which are driven, and the strength of the detected resonance signals. Further, the position detecting device 300 detects the pen pressure applied to the rod 11 of the position indicator 100 based on the phase change of the resonance signals of the position indicator 100 relative to the phase of the signals transmitted to the position indicator 100.

The configuration and operation principle of a first embodiment of the variable capacitor 10, to which the present invention is applied, will be described below with reference to FIGS. 2A to 2D. FIG. 2A is a top view showing the variable capacitor 10 to which the present invention is applied, FIG. 2B is a side view showing the same, and FIG. 2C is a side view showing the same when a pen pressure is applied.

The electrode 2 is arranged on the upper surface 1a of the dielectric 1, the electrode 2 having a predetermined area. The electrode 2 is connected to the resonant capacitor 15a of the circuit board 15. Further, the conductive portion 4 is provided on the lower surface 1b of the dielectric 1, and a connecting terminal 5 is provided on a third surface 1c (referred to as "circumferential surface" hereinafter) of the dielectric 1. In the present embodiment, the electrode 2, the conductive portion 4 and the connecting terminal 5 are formed by sintering a silver paste for example.

The conductive portion 4 is formed in a (wire-like) rectangle shape extending from the center toward the outer frame of the lower surface 1b of the dielectric 1. Incidentally, the center of the lower surface 1b of the dielectric 1 is a position where the dielectric 1 contacts the conductive member 3. Further, the connecting terminal 5 is formed so as to be continuous from the conductive portion 4 and extend in the axial direction of the dielectric 1. The connecting terminal 5 is connected to the resonant capacitor 15a of the circuit board 15. In other words, the conductive portion 4 is electrically connected to the resonant capacitor 15a through the connecting terminal 5.

The conductive member 3 is disposed so as to face the conductive portion 4 with a predetermined gap between the conductive member 3 and the conductive portion 4 (see FIG. 2B). The conductive member 3 has one end portion 3a thereof formed substantially in a hemisphere shape (dome shape), and the other end portion thereof formed substantially in a cylindrical shape. The one end portion 3a of the conductive member 3 faces the lower surface 1b of the dielectric 1. One end of the rod 11 is attached to the other end portion of the conductive member 3. The conductive member 3 is brought into contact with the conductive portion 4 when a pen pressure (a pressure) is applied to the rod 11, and the conductive member 3 moves away from the conductive portion 4 when the pressure applied to the rod 11 is released.

The conductive member 3 is formed of an elastically deformable conductive material. Examples of the elastically deformable conductive material include a silicone conductive rubber, a pressure sensitive conductive rubber (PRC) and the like. Since the conductive member 3 is formed of an elastically deformable conductive material, when the pen pressure (the pressure) applied to the rod 11 increases, the contact area between the lower surface 1b of the dielectric 1 and the conductive member 3 will increase proportionally to the increase of the pen pressure.

Although the present embodiment is described using an example in which the one end portion 3a of the conductive member of the position indicator according to the present invention is formed substantially in a hemisphere shape, the shape of the conductive member is not limited thereto but may be other shape as long as the area opposed to the electrode 2 increases proportionally to the increase of the pen pressure (the pressure) applied to the rod 11.

The operation of the variable capacitor 10, to which the present invention is applied, will be described below with reference to FIGS. 2B, 2C and 2D.

In the state where a pen tip 11a of the rod 11 (i.e., the other end of the rod 11) is not in contact with the upper surface 300a of the position detecting device 300, the conductive member 3 is physically separated away from the conductive portion 4 (see FIG. 2B).

On the other hand, when the pen tip 11a of the rod 11 is brought into contact with the upper surface 300a of the position detecting device 300, the stress of the force acted on the upper surface 300a of the position detecting device 300 is transmitted to the conductive member 3 through the rod 11. Thus, the conductive member 3 is moved along the direction of arrow "a", and therefore the end portion 3a of the conductive member 3 is brought into contact with the conductive portion 4 (see FIG. 2C). At this time, since the lower surface 1b of the dielectric 1 contacts the conductive member 3, the conductive member 3 will be deformed so that the area of the conductive member 3 opposed to the electrode 2 changes, and thereby the capacitance between the electrode 2 and the conductive member 3 changes.

Further, for example, if the user increases the pen pressure, the force in the direction of arrow "a" will increase, and therefore the conductive member 3 will be strongly pressed toward the lower surface 1b of the dielectric 1 so as to be further deformed (i.e., to be flattened) (see FIG. 2D). As a result, the area of the conductive member 3 opposed to the electrode 2 will further increase, and thereby the capacitance between the electrode 2 and the conductive member 3 will further increase. When the capacitance between the electrode 2 and the conductive member 3 changes, the phase of the electromagnetic wave transmitted from the resonant circuit will change.

Incidentally, if the pen tip 11a is detached from the upper surface 300a of the position detecting device 300, due to the elastic restoring force of the conductive member 3 and the weight of both the conductive member 3 and the rod 11, the conductive member 3 will be detached from the lower surface 1b of the dielectric 1 and the conductive portion 4 so as to be restored to its original state (see FIG. 2B).

If the relative dielectric constant of the dielectric is represented by "$\epsilon o$", the distance between two mutually faced electrodes of the capacitor is represented by "d", and the area of the electrodes is represented by "S", then the capacitance "C" of the capacitor can be calculated by the following formula:

$$C = \epsilon o(S/d)$$

In the state shown in FIG. 2B, since the conductive member 3 is physically separated from the conductive portion 4, the conductive member 3 is not electrically conducted to the conductive portion 4. Thus, the area S of the electrodes becomes zero, and therefore the capacitance of the variable capacitor 200 becomes zero.

Further, in the state where the conductive member 3 is brought into contact with the conductive portion 4 (see FIG. 2C), if the area where the electrode 2 and the conductive member 3 are opposed to each other is S1, then the capacitance C1 of the variable capacitor 10 can be calculated by the following formula:

$$C1 = \epsilon o(S1/d)$$

Further, in the state where the conductive member 3 is elastically deformed (see FIG. 2D), if the area of the electrodes is changed to S2 (S2>S1), then the capacitance C2 of the variable capacitor 10 can be calculated by the following formula:

$$C2 = \epsilon o(S2/d)$$

Thus, C2>C1, that is, the capacitance of the variable capacitor 10 is proportional to the area where the electrode 2 and the conductive member 3 are opposed to each other. In other words, the capacitance of the variable capacitor 10 changes in proportion to the area where the electrode 2 and the conductive member 3 are opposed to each other.

In the present embodiment, the conductive member 3 and the conductive portion 4 face each other with a predetermined distance. In other words, in the state where the pen tip 11a of the rod 11 is not in contact with the upper surface 300a of the position detecting device 300, the conductive member 3 is physically separated away from the conductive portion 4. However, the variable capacitor 10 according to the present invention may also be configured in such a manner in which the conductive member 3 and the conductive portion 4 face each other in a contact state (see FIG. 2C) even when the pen tip 11a is not in contact with the upper surface 300a of the position detecting device 300. Further, the variable capacitor 10 according to the present invention may also be configured in such a manner in which, in the state where the pen tip 11a of the rod 11 is not in contact with the upper surface 300a of the position detecting device 300, the conductive member 3 contacts the lower surface 1b of the dielectric 1 but does not contact the conductive portion 4.

Figure 3:
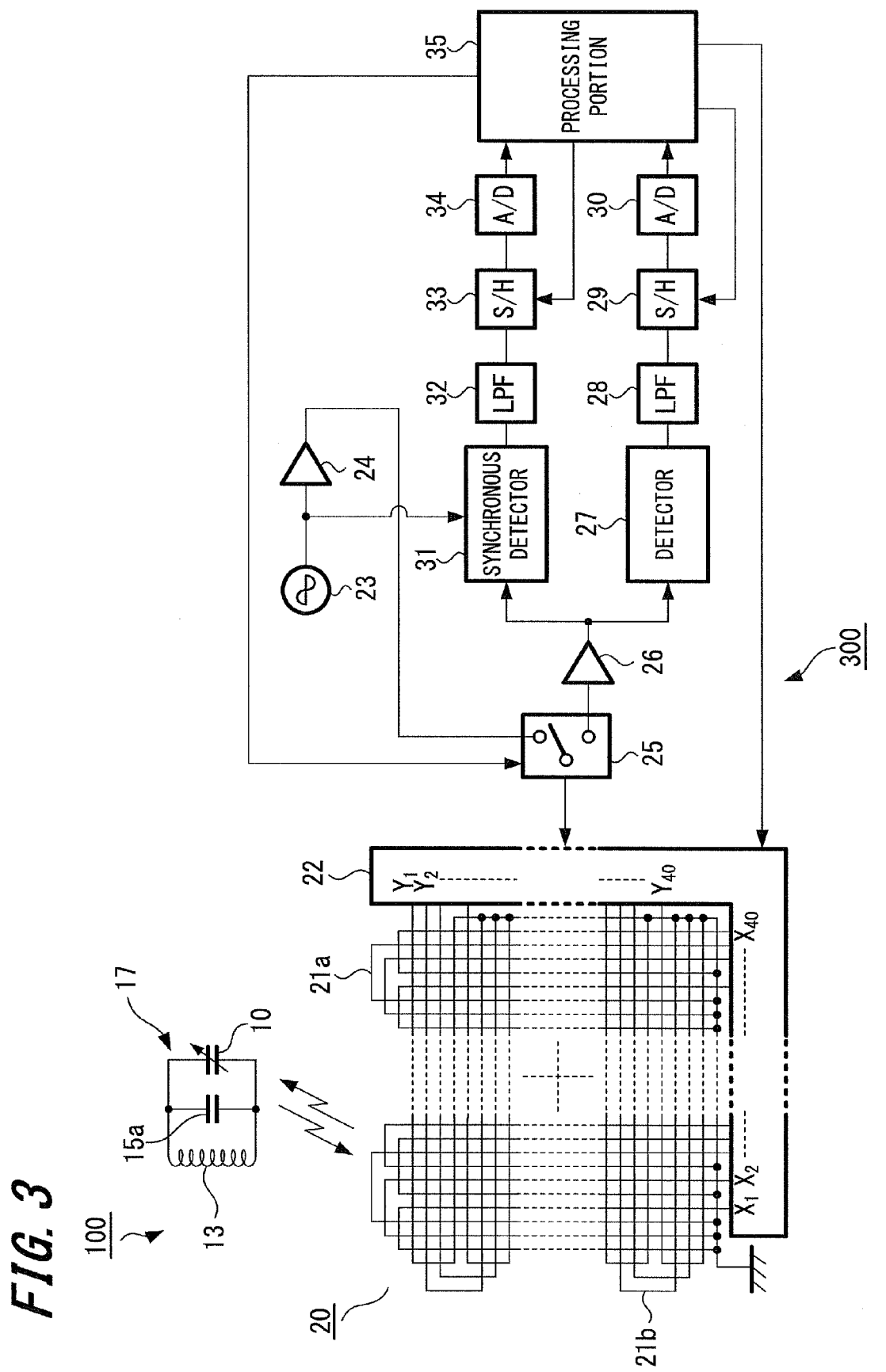
FIG. 3 is a block diagram schematically showing a circuit configuration of a position input device and a position indicator to which the present invention is applied.

A circuit configuration of one embodiment of the position detecting device 300 and the position indicator 100, to which the present invention is applied, will be described below with reference to FIG. 3.

The position indicator 100 includes the resonant circuit 17 that is configured with the position indicating coil 13, the variable capacitor 10 connected to the position indicating coil 13, and the resonant capacitor 15a.

The position detecting device 300 has a position detecting coil 20 configured by superimposing an X-axis direction loop coil group 21a and a Y-axis direction loop coil group 21b to each other. Each of the loop coil groups 21a, 21b is configured with, for example, forty rectangular loop coils. The loop coils of each of the loop coil group 21a and loop coil group 21b are sequentially overlapped with each other so that the loop coils are shifted from each other at an equal interval.

Further, the position detecting device 300 is provided with a selecting circuit 22 to which the X-axis direction loop coil group 21a and the Y-axis direction loop coil group 21b are connected. The selecting circuit 22 sequentially selects a loop coil from the loop coil group 21a and loop coil group 21b.

The position detecting device 300 further includes an oscillator 23, a current driver 24, a switching circuit 25, a receiving amplifier 26, a detector 27, a low-pass filter 28, a S/H circuit 29, an A/D conversion circuit 30, a synchronous detector 31, a low-pass filter 32, a S/H circuit 33, an A/D conversion circuit 34, and a processing portion 35.

The oscillator 23 generates an AC signal having a frequency f0, and supplies the AC signal to the current driver 24 and the synchronous detector 31. The current driver 24 converts the AC signal supplied from the oscillator 23 into a current and sends the current to the switching circuit 25. The transmission/reception switching circuit 25 switches the connection of the loop coil selected by the selecting circuit 22 between terminals-to-be-connected (i.e., a transmission side terminal T and a reception side terminal R) under the control of the processing portion 35, which is to be described later. Among the terminals-to-be-connected, the transmission side terminal T has the current driver 24 connected thereto, and the reception side terminal R has the receiving amplifier 26 connected thereto.

The induced voltage generated by the loop coil selected by the selecting circuit 22 is supplied to the receiving amplifier 26 through the selecting circuit 22 and the switching circuit 25. The receiving amplifier 26 amplifies the induced voltage supplied from the loop coil, and sends the amplified induced voltage to a detector 27 and the synchronous detector 31.

The detector 27 detects the induced voltage generated by the loop coil (namely, the detector 27 detects a received signal) and sends the detected signal to the low-pass filter 28. The low-pass filter 28, which has a cut-off frequency sufficiently lower than the frequency f0, converts the signal output from the detector 27 into a DC signal, and sends the DC signal to the S/H circuit (sample-and-hold circuit) 29. The S/H circuit 29 holds a voltage value of the signal output from the low-pass filter 28 at a predetermined timing (more specifically, at a predetermined time during a reception period), and sends the held value to the A/D conversion circuit (analog to digital conversion circuit) 30. The A/D conversion circuit 30 converts the value output from the S/H circuit 29, and outputs the converted result to the processing portion 35.

Further, the synchronous detector 31 synchronously detects the output signal from the receiving amplifier 26 with the AC signal from the oscillator 23, and sends a signal, whose level varies corresponding to the phase difference between the two signals, to the low-pass filter 32. The low-pass filter 32, which has a cut-off frequency sufficiently lower than the frequency f0, converts the signal output from the synchronous detector 31 into a DC signal, and sends the DC signal to the S/H circuit (sample-and-hold circuit) 33. The S/H circuit 33 holds a voltage value of the output signal from the low-pass filter 32 at a predetermined timing, and sends the held value to the A/D conversion circuit (analog to digital conversion circuit) 34. The A/D conversion circuit 34 analog/digital converts the value output from the S/H circuit 33, and outputs the result to the processing portion 35.

The processing portion 35 controls the respective sections of the position detecting device 300. Specifically, the processing portion 35 respectively controls the selecting operation of the loop coil performed by the selecting circuit 22, the switching operation performed by the switching circuit 25, and the determination of the timing at which the S/H circuits 29 and 33 hold the voltage value. Based on the signals input from the A/D conversion circuits 30 and 34, the processing portion 35 makes the X-axis direction loop coil group 21a and the Y-axis direction loop coil group 21b transmit an electromagnetic wave for a predetermined period.

Due to induction of the electromagnetic wave transmitted from the position indicator 100, induced voltages are generated by the respective loop coils of the X-axis direction loop coil group 21a and Y-axis direction loop coil group 21b. Based on the level of the induced voltages generated by respective loop coils of the X-axis direction loop coil group 21a and Y-axis direction loop coil group 21b, the processing portion 35 calculates the coordinate values of the position indicated by the position indicator 100 in both the X-axis direction and the Y-axis direction. Further, the processing portion 35 detects the pen pressure based on the phase difference between the transmitted electromagnetic wave and the received electromagnetic wave.

Figure 4:
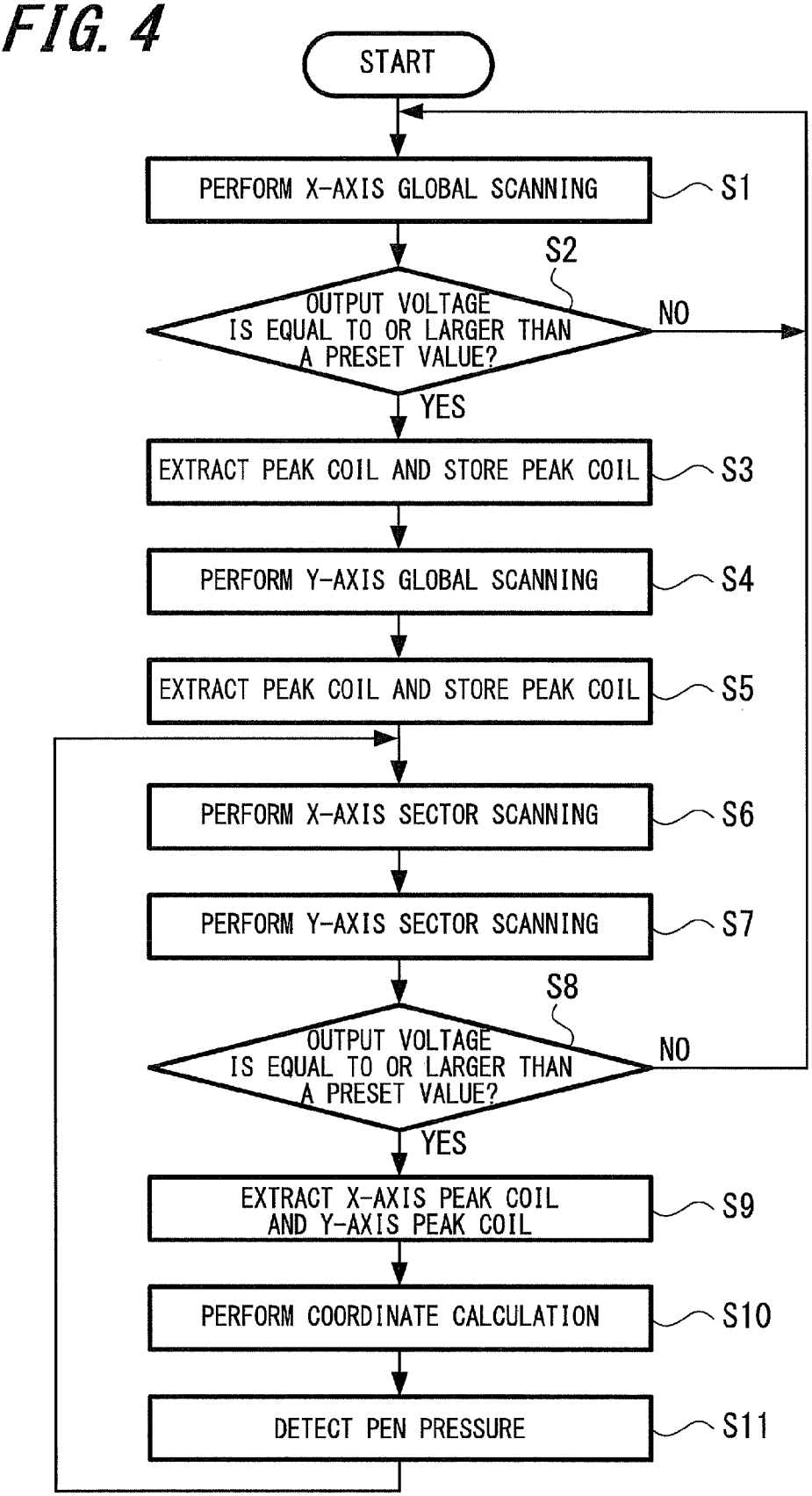
FIG. 4 is a flowchart showing processes executed by a processing portion of a position detecting device of an input device to which the present invention is applied.

The operation of the position detecting device 300 according to the processing flow of the processing portion 35 will be described below with reference to FIG. 4.

First, the processing portion 35 sequentially scans/selects the respective loop coils of the X-axis direction loop coil group 21a (Step S1). The operation of sequentially scanning/selecting the loop coils will be hereinafter referred to as "global scanning".

The details of the global scanning will be described below. Firstly, the processing portion 35 sends information to the selecting circuit 22 to make it select a first loop coil (loop coil $X_1$, for example) from the X-axis direction loop coil group 21a, and sends a signal to the transmission/reception switching circuit 25 to make it select a transmission side terminal T. Thus, a sinusoidal signal having the frequency f0 is supplied from the oscillator 23 to the loop coil $X_1$, and thereby an electromagnetic wave having the frequency f0 is generated by the loop coil $X_1$. At this time, if the position indicator 100 approaches or contacts the upper surface 300a of the position detecting device 300, the resonant circuit 17 having the position indicating coil 13 will be excited by the electromagnetic wave generated by the loop coil $X_1$. As a result, an induced voltage having the frequency f0 will be generated in the resonant circuit 17.

Then, after sending the signal to the switching circuit 25 to make it select the transmission side terminal T for a predetermined period, the processing portion 35 sends a signal to the switching circuit 25 to make it select a reception side terminal R, and thereby the electromagnetic wave generated by the loop coil $X_1$ is eliminated. At this time, the induced voltage generated in the resonant circuit 17, which includes the resonant capacitor 15a and the variable capacitor 10, of the position indicator 100 attenuates gradually due to the loss, while the resonant circuit 17 transmits an electromagnetic wave having the frequency f0. The loop coil $X_1$ is reversely excited by the electromagnetic wave transmitted from the resonant circuit 17, so that an induced voltage is generated in the loop coil $X_1$.

After sending the signal to the switching circuit 25 to make it select the reception side terminal R for a predetermined period, the processing portion 35 sends information to the selecting circuit 22 to make it select a second loop coil (loop coil $X_2$, for example) from the X-axis direction loop coil group 21a. Thereafter, the processing portion 35 sends a signal to the switching circuit 25 to make it select the reception side terminal R, and thereby performs transmission/reception of electromagnetic wave in the same manner as mentioned above.

Thereafter, the processing portion 35 performs the similar processing, so that 3rd to 40th loop coils (loop coils $X_3$ to $X_{40}$, for example) of the X-axis direction loop coil group 21a are sequentially scanned or selected. As a result, transmission/reception of electromagnetic wave is also performed in each of loop coils $X_3$ to $X_{40}$.

Incidentally, in the processing of Step S1, the processing portion 35 does not have to select every loop coil of the X-axis direction loop coil group 21a, but can select every other loop coil, every two loop coils or the like. Further, transmission/reception of electromagnetic wave may also be performed plural times on the selected loop coil. Furthermore, although the transmission time for each loop coil has to be the same and the reception time for each loop coil has to be the same, the transmission time and the reception time do not have to be equal to each other.

The induced voltage (i.e., the received signal) generated in the loop coil of the X-axis direction loop coil group 21a during the reception period is detected by the detector 27 to be converted into the DC signal and smoothed by the low-pass filter 28. Further, the signal output by the low-pass filter 28 is held by the S/H circuit 29 at the predetermined timing, and sent through the A/D conversion circuit 30 to the processing portion 35 as a voltage value.

Figure 5:
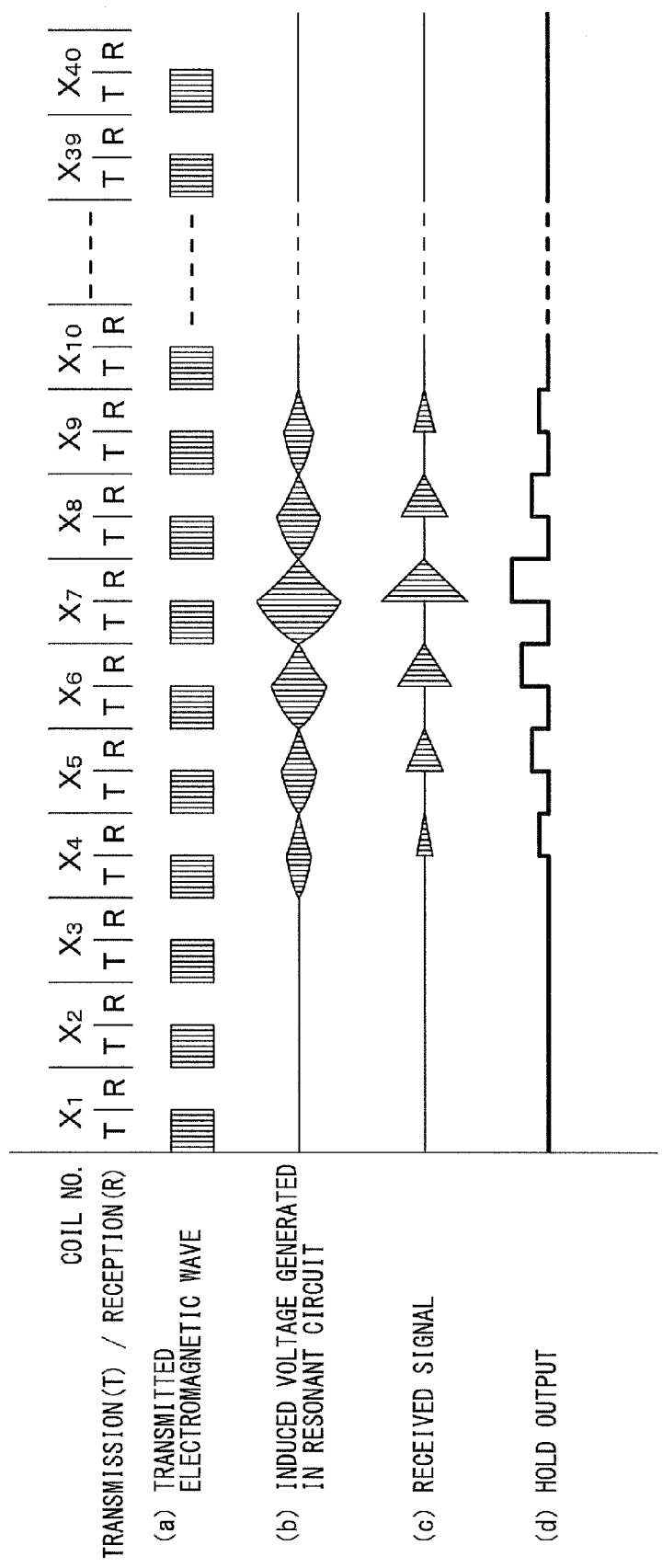
FIG. 5 is a waveform diagram showing an example of waveforms of respective sections of a position detecting device of an input device, to which the present invention is applied, while performing an X-axis global scanning.

FIG. 5 is a waveform diagram showing an example of waveforms of the respective sections while the global scanning (Step S1 in FIG. 4) is performed on the X-axis direction loop coil group 21a. In FIG. 5, (a) represents the electromagnetic wave transmitted from the position detecting coil 20, (b)

represents the induced voltage generated in the resonant circuit 17, (c) represents the received signal received by the position detecting device 300, and (d) represents the output signal output by the S/H circuit 29.

Here, the output level of the S/H circuit 29 depends on the distance between the position indicator 100 and the loop coil. Thus, the processing portion 35 determines whether or not the maximum value of the output level of the S/H circuit 29 is equal to or larger than a preset value (Step S2), and thereby determines whether or not the position indicator 100 is located within an effective reading height range of the position detecting device 300.

In the processing of Step S2, if it is determined that the maximum value of the output level of the S/H circuit 29 is smaller than the preset value, i.e., if it is determined that the position indicator 100 is not located within the effective reading height range of the position detecting device 300 (i.e., "NO" in Step S2), then the processing portion 35 returns the processing to Step S1.

If it is determined that the position indicator 100 is located within the effective reading height range (i.e., "YES" in Step S2), then the processing portion 35 extracts, among the loop coils $X_1$ to $X_{40}$, a loop coil causing the maximum value (referred to as "peak coil" hereinafter), and stores the number of the peak coil (Step S3). In the illustrated example the number of the peak coil is $X_7$.

Next, the processing portion 35 sequentially scans/selects the respective loop coils of the Y-axis direction loop coil group 21b, i.e., the processing portion 35 performs global scanning on the respective loop coils of the Y-axis direction loop coil group 21b (Step S4) to transmit/receive electromagnetic wave to/from the respective loop coils of the Y-axis direction loop coil group 21b.

Figure 6:
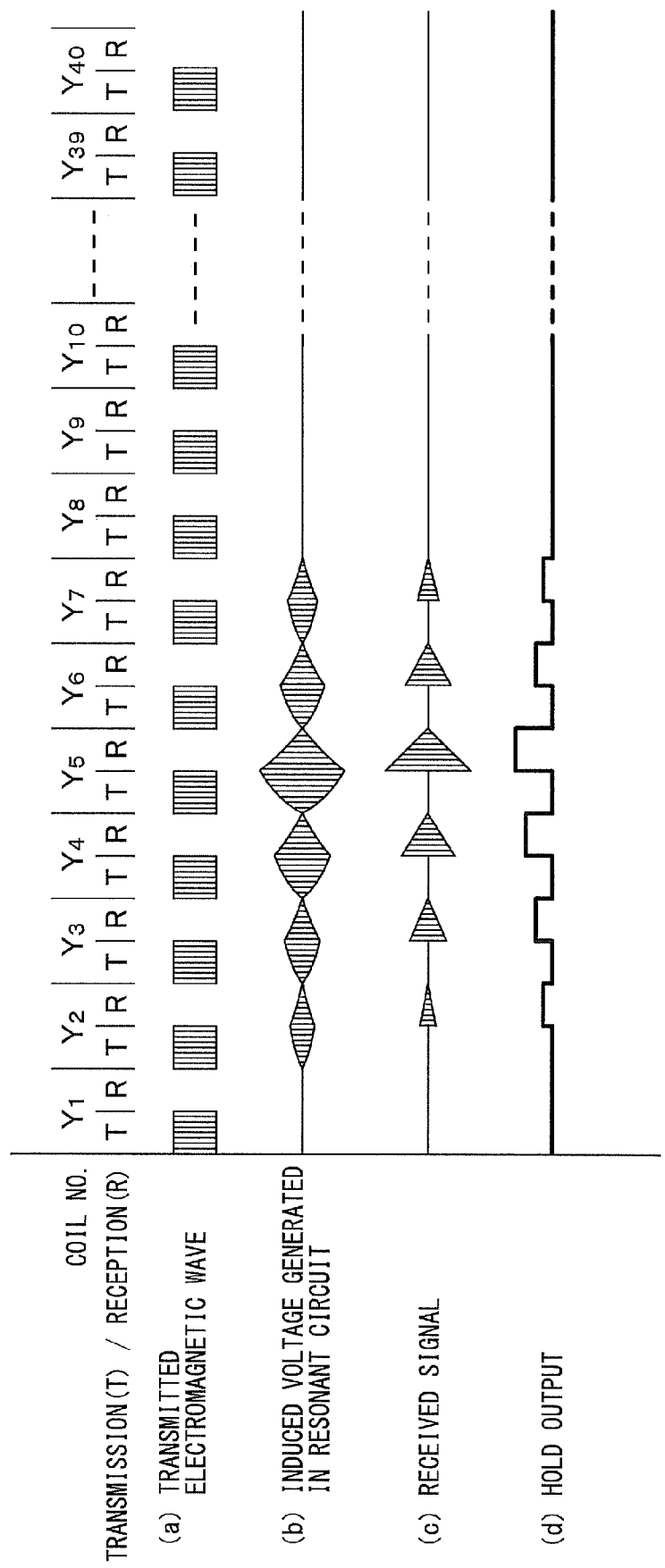
FIG. 6 is a waveform diagram showing an example of waveforms of the respective sections of a position detecting device of an input device, to which the present invention is applied, while performing a Y-axis global scanning.

FIG. 6 is a waveform diagram showing an example of waveforms of the respective sections while the global scanning is performed on the Y-axis direction loop coil group 21b.

The processing portion 35 extracts, among the loop coils $Y_1$ to $Y_{40}$, a loop coil causing the maximum value (referred to as "peak coil" hereinafter), and stores the number of the peak coil (Step S5). In the illustrated example the number of the peak coil is $Y_5$.

Next, the processing portion 35 performs transmission/reception of electromagnetic wave on a predetermined number of neighboring loop coils (for example, five loop coils) of the X-axis direction loop coil group 21a with the peak coil positioned as the center. In the transmission/reception operation of electromagnetic wave, when transmitting electromagnetic wave (namely when the switching circuit 25 selects the transmission side terminal T), the processing portion 35 constantly selects the peak coil (herein the loop coil $X_7$). When receiving electromagnetic wave (namely, when the switching circuit 25 selects the reception side terminal R), the processing portion 35 sequentially scans/selects the loop coils (five loop coils in the present embodiment) in an order from the smallest coil number to the largest coil number (or from the largest coil number to the smallest coil number) (Step S6). The operation of sequentially scanning/selecting the loop coils is referred to as "sector scanning" hereinafter.

After the sector scanning performed on the X-axis direction loop coil group 21a is completed, the processing portion 35 performs transmission/reception of electromagnetic wave on a predetermined number of neighboring loop coils (for example, five loop coils) of the Y-axis direction loop coil group 21b with the peak coil as the center. In the transmission/reception operation of electromagnetic wave, when performing transmission of electromagnetic wave (namely when the switching circuit 25 selects the transmission side terminal T), the processing portion 35 constantly selects the peak coil (herein the loop coil $Y_5$). When receiving electromagnetic wave (namely when the switching circuit 25 selects the reception side terminal R), the processing portion 35 sequentially scans/selects (i.e., performs sector scanning) the loop coils (five loop coils in the present embodiment) in an order from the smallest coil number to the largest coil number (or from the largest coil number to the smallest coil number) (Step S7).

Figure 7:
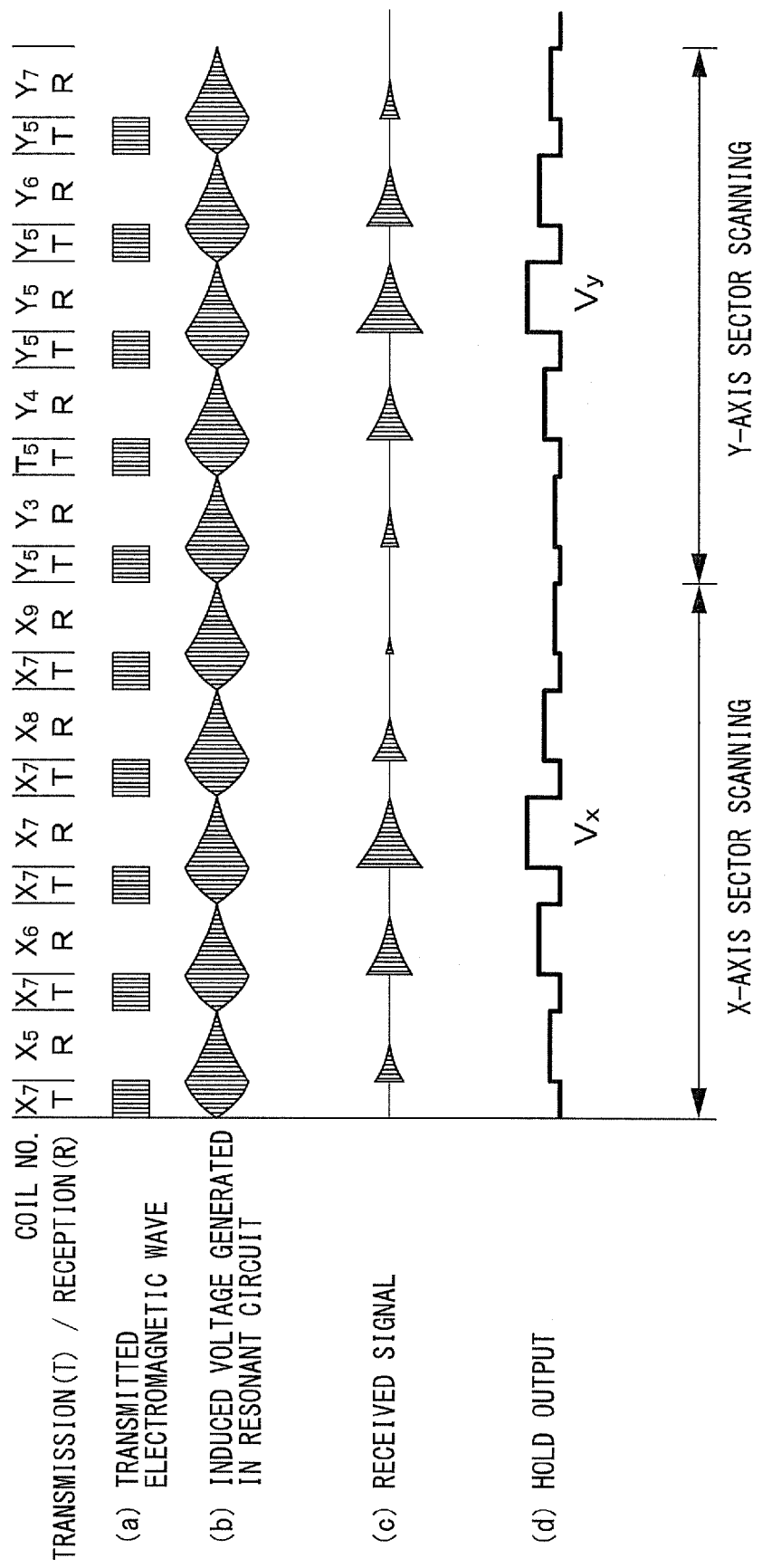
FIG. 7 is a waveform diagram showing an example of waveforms of the respective sections of a position detecting device of an input device, to which the present invention is applied, while performing an X-axis sector scanning and a Y-axis sector scanning.

FIG. 7 is a waveform diagram showing an example of waveforms of the respective sections while the sector scanning is performed on the X-axis direction loop coil group 21a and while the sector scanning is performed on the Y-axis direction loop coil group 21b.

After the sector scanning performed on the Y-axis direction loop coil group 21b is completed, the processing portion 35 determines whether or not the maximum value of the induced voltage obtained in the processing of Steps S6 and S7 is equal to or larger than the preset value (Step S8), and thereby determines whether or not the position indicator 100 is located within the effective reading height range of the position detecting device 300.

In the processing of Step S8, if it is determined that the maximum value of the output level of the S/H circuit 29 is smaller than the preset value, i.e., if it is determined that the position indicator 100 is not located within the effective reading height range (i.e., "NO" in Step S8), then the processing portion 35 returns the processing to Step S1.

If it is determined that the position indicator 100 is located within the effective reading height range of the position detecting device 300 (i.e., "YES" in Step S8), then the processing portion 35 extracts the X-axis direction peak coil and Y-axis direction peak coil causing the maximum value, and stores the numbers of the both peak coils (Step S9).

Next, the processing portion 35 extracts a plurality of induced voltages (for example, three induced voltages), in descending order from high level to low level, from the X-axis sector scanning and the Y-axis sector scanning respectively, and calculates, based on the extracted signals, the coordinate values of the position indicated by the position indicator 100 in both the X-axis direction and Y-axis direction (Step S10). The coordinate values in both the X-axis direction and Y-axis direction may be calculated according to a known method disclosed in Japanese Patent No. 2131145 previously filed and commonly assigned as the present application.

Next, the processing portion 35 detects the pen pressure based on the signal whose level varies corresponding to the phase difference between the transmitted electromagnetic wave and the received electromagnetic wave (Step S11). Then, as long as the position indicator 100 remains located within the effective reading height range, the processing portion 35 repeats the processing of Steps S6 to S11; and if it is determined that the position indicator 100 is not located within the effective reading height range, then the processing portion 35 returns the processing to Step S1.

Thus, in the position detecting device 300, the processing portion 35 can detect the position where the position indicator 100 has approached. Further, by detecting the phase of the received signal, information about the pen pressure value of the position indicator 100 can be obtained.

In the present embodiment, the variable capacitor (the pen-pressure detecting section) 10 is configured with the dielectric 1, the electrode 2 provided on the upper surface 1a of the dielectric 1, the conductive portion 4 provided on the lower surface 1b of the dielectric 1, and the conductive member 3 arranged so as to face the conductive portion 4. With such a configuration, the number of components can be reduced compared with the known variable capacitor (see FIGS. 16A and 16B), and the configuration of the variable capacitor can be significantly simplified.

Further, since the elements collaterally necessary for forming the known variable capacitor (such as terminals 206 and 207 shown in FIGS. 16A and 16B) are eliminated, the outer diameter of the variable capacitor can be reduced from approximately 7 mm (the outer diameter of the known variable capacitor) to approximately 5 mm, for example. Incidentally, in a case where the inner diameter of the position indicator 100 is set to 9 mm (namely, set to the same size of the known position indicator), the margin of 2 mm can be used to install a reinforcing member or a buffer member, for example, to improve durability and impact resistance of the position indicator.

Figure 8:
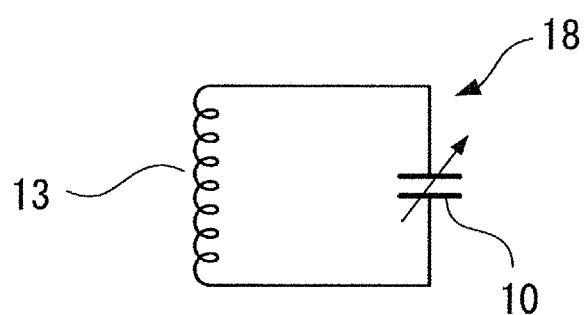
FIG. 8 is an illustration showing a second embodiment of a resonant circuit provided in a position indicator to which the present invention is applied.

FIG. 8 is an illustration showing a second embodiment of the resonant circuit provided in the position indicator 100. The second embodiment of the resonant circuit is denoted by reference numeral 18. The resonant circuit 18 is configured with the position indicating coil 13 and the variable capacitor 10. In the resonant circuit 17 (the first embodiment of the resonant circuit), two capacitors are used, which are the variable capacitor 10 and the resonant capacitor 15a connected in parallel with each other (see FIG. 3). However, the resonant circuit according to the present invention includes a configuration in which only one capacitor (the variable capacitor 10) is used.

Next, examples of the shape of the electrode, the conductive portion and the connecting terminal provided on the dielectric 1 will be described below with reference to FIGS. $9A_1$, $9A_2$, $9B_1$, $9B_2$, $9C_1$, $9C_2$, $9C_3$ and $9C_4$. FIGS. $9A_1$ and $9A_2$ show examples of the shape of the electrode provided on the upper surface 1a of the dielectric 1. FIGS. $9B_1$ and $9B_2$ show examples of the shape of the conductive portion provided on the circumferential surface 1c of the dielectric 1, and FIGS. $9C_1$, $9C_2$, $9C_3$ and $9C_4$ show examples of the shape of the conductive portion provided on the lower surface 1b of the dielectric 1.

First, examples of the shape of the electrode provided on the upper surface 1a of the dielectric 1 will be described below. Examples of the electrode according to the present invention include, for example, a circular electrode 2A that covers substantially the whole upper surface 1a of the dielectric 1 (see FIG. $9A_1$), and a semicircular electrode 2B that covers substantially half of the upper surface 1a of the dielectric 1 (see FIG. $9A_2$). Note that the shape of the electrode provided on the upper surface 1a of the dielectric 1 is not limited to circular and semicircular, but includes various shapes such as elliptical shape, polygonal shape (e.g., triangular, rectangular, etc.), and the like.

Next, examples of the shape of the connecting terminal provided on the circumferential surface 1c of the dielectric 1 will be described below. Examples of the connecting terminal include a connecting terminal 5A having a relatively large width (see FIG. $9B_1$) and a connecting terminal 5B having a relatively small width (see FIG. $9B_2$). For example, the width dimension (dimension in circumferential direction of the dielectric 1) of the connecting terminal 5A is set to 0.5-1.0 mm, and the width dimension of the connecting terminal 5B is set to 0.2 mm.

FIG. 10 is an illustration showing the initial capacitance and Q factor (quality factor) of the variable capacitor 10 in the case where the electrodes 2A, 2B and the connecting terminals 5A, 5B are applied.

If the electrode provided on the upper surface 1a of the dielectric 1 has the same shape (for example, the electrode has the shape of the electrode 2A), the initial capacitance is smaller in the case where the connecting terminal 5B is provided on the circumferential surface 1c than in the case where the connecting terminal 5A is provided on the circumferential surface 1c. Thus, the initial capacitance between the electrode provided on the upper surface 1a of the dielectric 1 and the conductive portion provided on the lower surface 1b of the dielectric 1 can be reduced by reducing the width dimension of the connecting terminal, namely, by reducing the area of the connecting terminal.

Next, examples of the shape of the conductive portion provided on the lower surface 1b of the dielectric 1 will be described below. Examples of the conductive portion include, for example, a conductive portion 4A (see FIG. $9C_1$), a conductive portion 4B (see FIG. $9C_2$), a conductive portion 4C (see FIG. $9C_3$), and a conductive portion 4D (see FIG. $9C_4$).

The conductive portion 4A (Pattern 1) has an elongated rectangle shape extending in the radial direction of the dielectric 1. The long side of the conductive portion 4A is set to a length extending from the outer frame to the center of the lower surface 1b (i.e., a length equal to the radius of dielectric 1). Similar to the conductive portion 4A, the conductive portion 4B (Pattern 2) has an elongated rectangle shape extending in the radial direction of the dielectric 1. The long side of the conductive portion 4B is set to a length extending from the outer frame to a position beyond the center of the lower surface 1b (i.e., a length longer than the radius of dielectric 1).

The conductive portion 4C (Pattern 3) includes a circular portion $4C_1$ arranged at the center of the dielectric 1 and an elongated rectangular portion $4C_2$ continuing from the circular portion $4C_1$ to the outer frame of the lower surface 1b. The conductive portion 4D (Pattern 4) has an elongated rectangle shape extending in the radial direction of the dielectric 1. The long side of the conductive portion 4D is set to a length extending from the outer frame to a position before the center of the lower surface 1b (i.e., a length shorter than the radius of dielectric 1).

In the present embodiment, the conductive member 3 and the dielectric 1 are arranged so that the center axis of conductive member 3 is aligned with the center of the dielectric 1. Thus, if any one of the conductive portions 4A, 4B and 4C is used as the conductive portion, the conductive member 3 will be brought into contact with the any one of the conductive portions 4A, 4B and 4C before the conductive member 3 is elastically deformed.

However, if the conductive portion 4D is used as the conductive portion, the conductive member 3 will first be brought into contact with the lower surface 1b of the dielectric 1, and then be brought into contact with the conductive portion 4D after the conductive member 3 is elastically deformed due to being pressed by the lower surface 1b of the dielectric 1.

FIG. 11 is a graph showing pen pressure level-load characteristics respectively in the cases where the conductive portions 4A, 4B, 4C and 4D are used as the conductive portion. In the case where the conductive portion 4A (Pattern 1) is used, the pen pressure level and the load show approximately a linear relation. In the case where the conductive portion 4B (Pattern 2) is used, the relation between the pen pressure level and the load is slightly deviated from the linear relation. On the other hand, in the case where the conductive portion 4C (Pattern 3) is used, the output of the pen pressure level is zero until the load reaches a predetermined value. This is because the conductive portion 4C functions as the second electrode until the area of the conductive member 3 opposed to the electrode 2 increases to exceed the area of the circular portion $4C_1$. Further, in the case where the conductive portion 4D (Pattern 4) is used, the output of the pen pressure level is an arbitrary initial value until the load reaches a predetermined value. This is because the conductive member 3 does not contact the conductive portion 4 until the area of the conductive member 3 opposed to the electrode 2 reaches a predetermined value.

As described above, various characteristics can be obtained by changing the shape of the conductive portion. When using the position indicator, the user can take advantage of the difference of the characteristics to obtain different writing feels. Thus, by changing the shape of the conductive portion, it is possible to provide plural types of position indicators with different writing feels in accordance with different purposes, and therefore choices of the position indicator can be increased.

Next, combinations of the electrode provided on the upper surface 1a of the dielectric 1 and the conductive portion provided on the lower surface 1b of the dielectric 1 will be described below with reference to FIGS. 12A, 12B, 13A and 13B.

A first combination of the electrode and the conductive portion is configured with the electrode 2B and the conductive portion 4A (see FIGS. 12A and 12B). The conductive portion 4A and the electrode 2B are arranged so that they do not overlap with each other in a direction in which the upper surface 1a and the lower surface 1b of the dielectric 1 oppose each other. Thus, by positioning the conductive portion 4A and the electrode 2B so that they do not overlap with each other, the initial capacitance between the electrode 2B (the first electrode) and the conductive member 3 (the second electrode) can be reduced.

A second combination of the electrode and the conductive portion is configured with an electrode 2C and the conductive portion 4B (see FIGS. 13A and 13B). The electrode 2C has a substantially U-shape, and is formed by providing a cutout 2d in a semicircular electrode that covers substantially half of the upper surface 1a of the dielectric 1, wherein the cutout 2d extends in the radial direction. On the other hand, an end portion $4B_1$ of the conductive portion 4B overlaps with the cutout 2d of the electrode 2C in the direction in which the upper surface 1a and the lower surface 1b of the dielectric 1 oppose each other. Further, the other end portion $4B_2$ of the conductive portion 4B overlaps with the half surface uncovered by the electrode 2C. Thus, the electrode 2C and the conductive portion 4B are arranged so that they do not overlap with each other in the direction in which the upper surface 1a and the lower surface 1b of the dielectric 1 oppose each other. Similar to the first combination (see FIGS. 12A and 12B), with the second combination, the initial capacitance between the electrode 2C (the first electrode) and the conductive member 3 (the second electrode) can also be reduced.

Next, a second embodiment of the dielectric according to the present invention will be described below with reference to FIG. 14.

The second embodiment of the dielectric is denoted by reference numeral 51. The dielectric 51 includes a first dielectric member 51A and a second dielectric member 51B. The two dielectric members 51A, 51B are formed by dividing a flat cylindrical shape dielectric into two in the axial direction, and have the same shape. In other words, the flat cylindrical shape dielectric 51 is formed by arranging the two dielectric members 51A, 51B in the planar direction.

An electrode 56A is provided on a first surface (referred to as "upper surface" hereinafter) 52 of the first dielectric member 51A. The electrode 56A has a semicircular shape that covers substantially the whole upper surface 52 of the first dielectric member 51A. Further, a conductive portion (not shown) and a connecting terminal (not shown) are provided on the first dielectric member 51A. The conductive portion is arranged on a second surface (referred to as "lower surface" hereinafter) 53 of the first dielectric member 51A, and the connecting terminal is arranged on a circumferential surface 54 of the first dielectric member 51A. The conductive member 3 (see FIG. 1) faces the conductive portion arranged on the lower surface 53 of the first dielectric member 51A.

Further, an electrode 56B is provided on a first surface (referred to as "upper surface" hereinafter) 55 of the second dielectric member 51B. The electrode 56B has a semicircular shape that covers substantially the whole upper surface 55 of the second dielectric member 51B.

Note that, although the conductive portion and the connecting terminal are provided on the first dielectric member 51A in the present embodiment, the conductive portion and the connecting terminal may also be provided on the second dielectric member 51B. Further, although the dielectric 51 is configured with the two dielectric members 51A, 51B in the present embodiment, the dielectric according to the present invention may also be configured with a single dielectric member as is described in the first embodiment (see FIG. 2A), or be configured with three or more dielectric members.

With the variable capacitor, the position indicator and the input device using the dielectric 51, the same advantages as those of the first embodiment, in which the dielectric 1 is used, can also be achieved. In other words, the capacitance between the electrodes 56A, 56B and the conductive member (the second electrode) can be changed by changing the area of the conductive member opposed to the electrodes 56A, 56B. Thus, it is possible to simplify the configuration of the variable capacitor serving as the pen-pressure detecting section, and therefore reduce the inner diameter of the position indicator.

Next, a second embodiment of the position indicator according to the present invention will be described below with reference to FIG. 15. Incidentally, in FIG. 15, components identical to those in FIG. 3 are denoted by the same reference numerals as of FIG. 3, and detailed explanation thereof will be omitted.

The second embodiment of the position indicator is denoted by reference numeral 101. The position indicator 101 has a resonant circuit 36 which resonates at a frequency f0 output from the position detecting coil 20 (see FIG. 3) provided in the position detecting device 300. A resonant circuit 36 is configured with the position indicating coil 13 and the resonant capacitor 15a. Further, an integrated circuit 37 based on a well-known CMOS (Complementary Metal Oxide Semiconductor) technology is mounted on the circuit board 15 (see FIG. 1) of the position indicator 101. The integrated circuit 37 is driven by a driving power generated by a diode 38 and a capacitor 39.

The diode 38 is connected to the resonant circuit 36. Further, an AC voltage generated in the resonant circuit 36 based on an excitation signal supplied from the position detecting coil 20 is applied to the diode 38. The AC voltage is rectified by the diode 38 and the capacitor 39 and converted into a DC voltage so as to serve as the driving power for driving the integrated circuit 37. Further, the signal generated by the resonant circuit 36 is supplied to the integrated circuit 37 through a capacitor 40. Based on the signal supplied through the capacitor 40, the integrated circuit 37 generates a clock signal for sending/receiving signals between the position indicator 101 and the position detecting device 300 and a clock signal for detecting the pen pressure.

Figure 1:
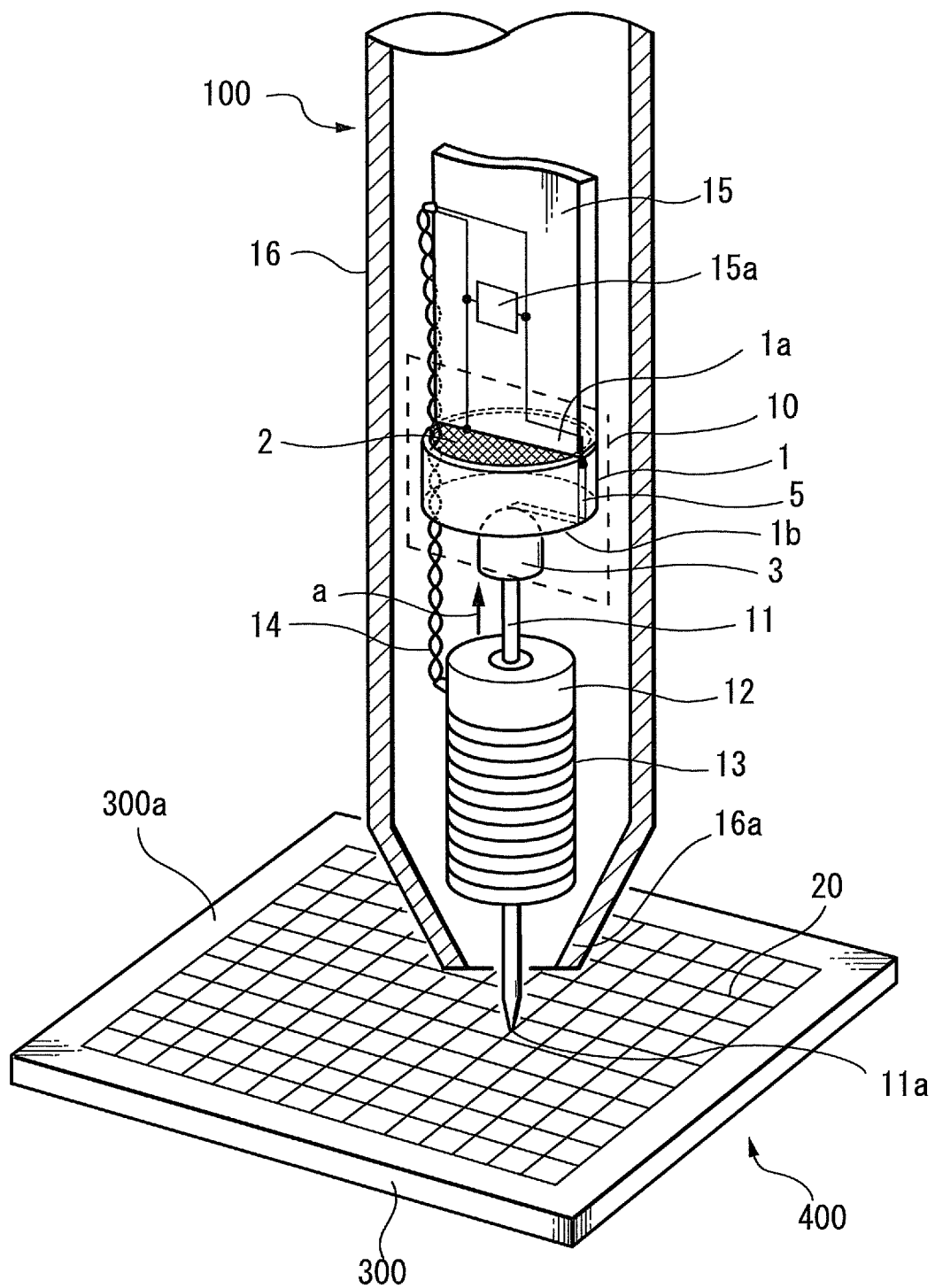
FIG. 1 is an illustration showing a configuration of an embodiment of an input device to which the present invention is applied.

As described above, the capacitance of the variable capacitor 10 changes in response to the pen pressure applied to the rod 11 (see FIG. 1). The variable capacitor 10 is connected to a resistor (not shown) to form a time-constant circuit. Thus, when the capacitance of the variable capacitor 10 changes in response to the pen pressure, the time constant of the time-constant circuit will change. Further, the time constant is converted by the integrated circuit 37 to a pen pressure value of a predetermined bits (for example, 8 bits).

The pen pressure data (a pen pressure value of 8 bits) obtained in such a manner is output from the integrated circuit 37 bit by bit in synchronization with the clock signal, which is provided for sending/receiving signals between the position detecting device 300 and the position indicator 101. By outputting the pen pressure data, the integrated circuit 37 controls the ON/OFF operation of a switch 15b connected in parallel to the resonant circuit 36. Thus, when the switch 15b is turned off, the signal output from the position indicator 101 is detected by the position detecting device 300. When the switch 15b is turned on, since the resonant circuit 36 is shunted, the signal output from the position indicator 101 cannot be detected by the position detecting device 300.

Thus, by transmitting the excitation signal for supplying power to the position indicator 101 from the position detecting coil 20 for a predetermined time and then detecting the signal transmitted from the position indicator 101, the position detecting device 300 can obtain the pen pressure applied to the rod 11.

In the position indicator 101 of the present embodiment, by using the variable capacitor 10, it also is possible to simplify the configuration of the variable capacitor 10 serving as the pen-pressure detecting section, and therefore to reduce the inner diameter of the case 16 (see FIG. 1).

As described above, with the variable capacitor, the position indicator, the input device and the pressure detecting method according to the present invention, it is possible to simplify the configuration of the variable capacitor that constitutes the pen-pressure detecting section, and it is possible to reduce the inner diameter of the position indicator. Further, the pen pressure level-load characteristic can be adjusted by properly selecting the shape and position of the conductive portion provided on the second surface (the lower surface) of the dielectric. As a result, it is possible to prepare plural types of position indicators with different writing feels, and therefore choices of the position indicator can be increased.

It should be noted that the present invention is not limited to the above embodiments but includes various modifications without departing from the spirit of the claims of the present invention.

What is claimed is:

1. A position indicator comprising:
 a substantially elongated case;
 a rod partially housed in the case and having a first end protruding outside the case and a second end extending inside the case; and
 a variable capacitor housed inside the case and configured to change its capacitance when an external force is applied through the rod to the variable capacitor,
 wherein the variable capacitor includes:
  at least one dielectric having a first surface and a second surface opposite the first surface;
  an electrode provided in a defined shape to cover a first defined area on the first surface of the dielectric;
  a conductive member attached to the second end of the rod such that it faces the second surface of the dielectric; and
  a conductive portion having a defined width and a defined length to cover a second defined area on the second surface of the dielectric, the second defined area being less than half the first defined area and the conductive portion being electrically connectable to the conductive member,
  wherein the conductive member is configured to be elastically deformed when pressed against the second surface of the dielectric by the external force applied through the rod, such that the capacitance of the variable capacitor changes according to a change of the external force, and
  wherein no area of the electrode provided on the first surface of the dielectric overlaps with the conductive portion provided on the second surface of the dielectric in a direction in which they oppose each other.

2. The position indicator according to claim 1, wherein the conductive member is configured to be selectively brought into contact with, or separated from, the conductive portion.

3. The position indicator according to claim 2, wherein the conductive member is electrically connected to the conductive portion when the conductive member comes into contact with the second surface of the dielectric.

4. The position indicator according to claim 3, wherein the conductive member is elastically deformed when brought into contact with the conductive portion so as to be electrically connected to the conductive portion.

5. The position indicator according to claim 2, wherein the conductive portion extends from a point where the conductive member and the second surface of the dielectric contact each other to an outer frame of the second surface of the dielectric.

6. The position indicator according to claim 5, wherein the dielectric has a third surface continuous with the second surface of the dielectric, and the position indicator has a connecting terminal provided on the third surface, the connecting terminal being electrically connected to the conductive portion.

7. The position indicator according to claim 1, wherein the electrode includes a cutout shaped and arranged to extend in a radial direction to correspond to at least a portion of the conductive portion so that the electrode and the conductive portion do not overlap with each other in a direction in which they oppose each other.

8. The position indicator according to claim 1, wherein the electrode covers substantially the whole of the first surface of the dielectric.

9. The position indicator according to claim 8, wherein the conductive portion is formed in a substantially bar-shape, and the electrode is formed in a substantially U-shape.

10. The position indicator according to claim 1, wherein the electrode covers substantially half of the first surface of the dielectric.

11. The position indicator according to claim 10, wherein the conductive portion is formed in a substantially bar-shape, and the electrode is formed in a substantially U-shape.

12. An input device comprising:
 a position indicator having a case; a rod housed in the case, a first end of the rod protruding outside the case and a second end extending inside the case; and a variable capacitor housed inside the case and configured to change its capacitance when an external force is applied through the rod to the variable capacitor; and
 a position detecting device configured to detect a position of the position indicator indicated by the first end of the rod and having an input surface on which the first end of the rod indicates said position,
 wherein the variable capacitor includes:
  at least one dielectric having a first surface and a second surface opposite the first surface;

an electrode provided in a defined shape to cover a first defined area on the first surface of the dielectric;

a conductive member attached to the second end of the rod such that it faces the second surface of the dielectric; and a conductive portion having a defined width and a defined length to cover a second defined area on the second surface of the dielectric, the second defined area being less than half the first defined area and the conductive portion being electrically connectable to the conductive member, wherein the conductive member is configured to be elastically deformed when pressed against the second surface of the dielectric by the external force applied through the rod, such that the capacitance of the variable capacitor changes according to a change of the external force, and wherein no area of the electrode provided on the first surface of the dielectric overlaps with the conductive portion provided on the second surface of the dielectric in a direction in which they oppose each other.

13. The input device according to claim 12, wherein the conductive member is configured to be selectively brought into contact with, or separated from, the conductive portion.

* * * * *